United States Patent Office 3,261,378
Patented July 19, 1966

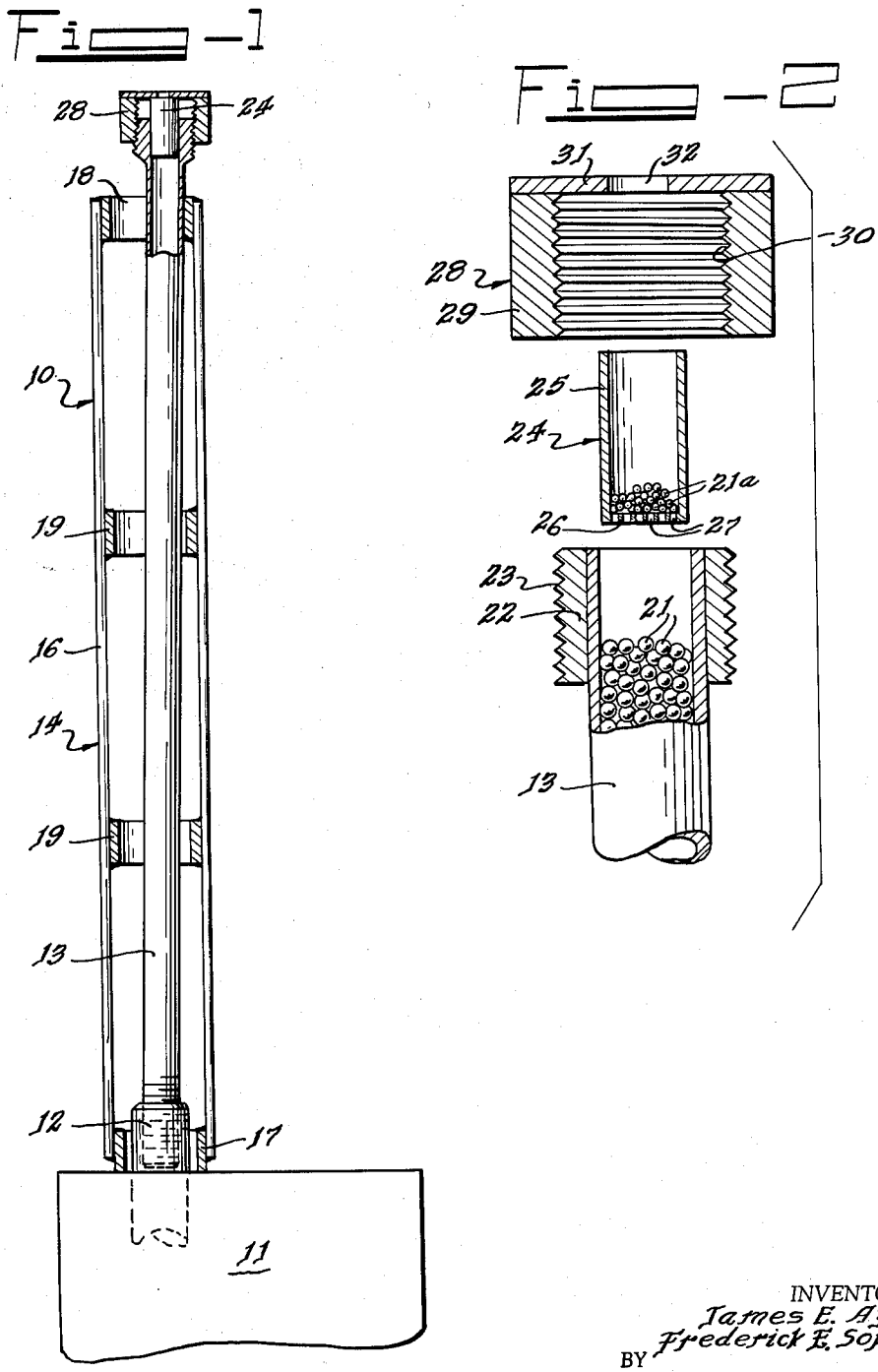

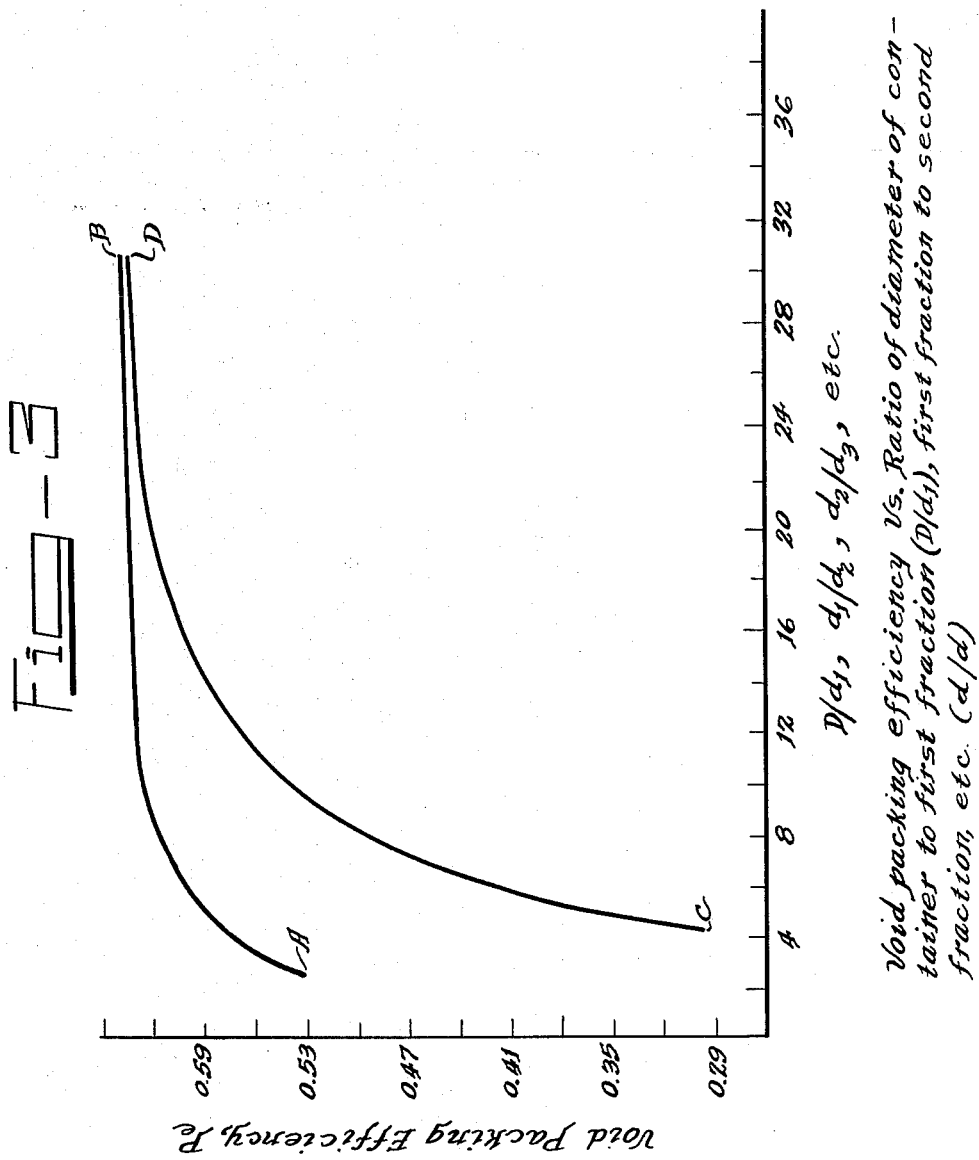

3,261,378
METHOD AND APPARATUS FOR VIBRATORY COMPACTION
James E. Ayer, Joliet, and Frederick E. Soppet, Calumet Park, Ill., assignors to the United States of America as represented by the United States Atomic Energy Commission
Filed Apr. 8, 1964, Ser. No. 358,389
10 Claims. (Cl. 141—12)

The invention described herein was made in the course of, or under, a contract with the United States Atomic Energy Commission.

The invention relates to a novel method and apparatus for vibratory compaction, more particularly for the compaction of masses such as spheres of fuel and blanket material into elongated tubes, plates and other such shapes for use in nuclear reactors.

Many of the more advanced designs for nuclear reactors call for having the fuel or blanket material in the form of small masses such as spheres arranged closely together within tubes, plates and other such shapes, rather than in the form of large unitary castings or compacts. There are a number of reasons for this, including improved growth and swelling characteristics under irradiation, improved ventilation when the individual masses such as spheres are uncoated and improved fission product containment when the spheres are coated with a containing material. The last-named advantage is particularly applicable when the materials are ceramic in character, such as the oxides, nitrides, carbides, sulfides and other such compounds of the actinide elements.

The two main difficulties in making fuel elements with small mass arrangements have been to get them sufficiently dense, and even more important, sufficiently uniform so that they may be controllable. In order to meet these problems, vibratory compaction has been found to be the best method of bringing small masses into a close-packed, uniform configuration, but so far this method has been dependable only when all the masses are substantially of the same diameter, for reasons that will now be explained.

When spheres of the same size are in a close-packed configuration the void between them, though often referred to in the plural, is actually a single continuous space made up of intersecting passages, or channels, the cross-sectional shape of which is that of equilateral triangles with slightly concave sides. The volume of these channels is a function of the radius of the spheres. On the other hand, the number of the channels in a given volume of close-packed spheres is an inverse function of the radius. The two functions cancel each other out, with the result that, regardless of the size of the spheres, the fraction of any volume which they can occupy is a constant whose value to three decimal places has been determined to be 0.635. For this reason the density which vibratory compaction can bring about with fuel of uniform diameter is strictly limited to something less than this value, because the spheres themselves are always something short of theoretical density.

In order to increase the over-all density it has been attempted to compact spheres of two different diameters together, it being reasoned that those of smaller diameter could occupy the cross-sectionally triangular void space between the larger spheres. Carrying the matter a step further, a third charge of spheres could be introduced to occupy the remaining void space, and so on.

While this line of reasoning is basically sound, applying it runs into great difficulties of two different types: mechanical and mathematical. The mechanical difficulties are that when spheres of only two different sizes are vibratorily compacted together they do not mix uniformly. The spheres of smaller size tend to mass together, or bridge, as it is commonly called, and if the vibration is continued long enough they tend to stratify with the ultimate outcome of all the smaller particles going to the bottom and the larger ones rising to the top in two discrete layers.

The mathematical difficulties are no less serious. Piling of spherical cannon balls and musket balls together has been brought about successfully by trial and error hand methods, but methods of this kind are practical only for organizations with practically unlimited manpower and time. Surprising as it may seem, no simple, usable mathematical method has been worked out for determining the quantities and sizes of spheres of different radii that may be arranged together efficiently. If this, along with the mechanical difficulties above mentioned, could be overcome it would lead to greater ease and economy in fabricating not only fuel elements, but also in other situations, such as the loading of packing towers, or when it is desired to make a close-packed configuration of some kind preliminary to extruding it.

It is accordingly, the general object of the invention to provide a method of vibratorily compacting together masses such as spheres of varying diameters to produce a uniform configuration.

It is another object to provide an apparatus for carrying out the foregoing method.

Other objects will appear as the description proceeds.

The above objects are attained by the invention which includes a device for supplementing the vertical, or axial, vibration normally used for vibratory compaction with vibration normal to it, or radially. Along with this is a supplementary pressure device which coacts with the first-mentioned device to eliminate the stratification which is normally caused by radial vibration when two components are present. It holds the spheres of larger diameter firmly in position, thus forming a kind of matrix through which the smaller spheres may move freely and thus seek out positions of equilibrium, which leads to a high degree of packing efficiency and uniformity. Finally, we have discovered a mathematical formula for selecting spheres of diameters such that the overall volume occupied by the spheres of two or more diameters may be controlled, whereby the total void space may either be reduced to a minimum, as is sometimes desirable, or left at a predetermined value as is desirable in other cases such as where it is contemplated to add a liquid heat transfer agent such as sodium, or where void space is desired to insure the escape of fission product gases.

Reference is now made to the drawings, FIG. 1 of which is a longitudinal sectional view of the apparatus for carrying out the invention.

FIG. 2 is an exploded sectional view of the upper part of the apparatus of FIG. 1.

FIG. 3 is a graph in which void packing efficiency as ordinates is plotted against certain ratios as abscissae. The upper curve is the ratio of the inner diameter of a tube to the diameter of the largest spheres compacted within it $(D/d_1)$; the lower curve is the ratio of diameter of the largest spheres compacted within the tube to the second largest spheres $(d_1/d_2)$, and also of that of the diameter of the last-named spheres to the next largest spheres $(d_2/d_3)$, and so on, all these ratios falling on the same curve as will be explained.

Referring to FIGS. 1 and 2, the numeral 10 designates our improved vibratory compaction apparatus generally. It consists of a conventional vibrator 11, on which is firmly attached holder 12 which grips the bottom of tube 13 securely. Resting on vibrator 11 and surrounding tube 13 is open cage 14, which we refer to as a rattle cage. It consists of upright supporting members 16, bottom collar 17, upper collar 18, and intermediate collars 19, in this case two in number. Tube 13 in this case is made of hard glass, holding a charge of spheres 21 of uniform diameter which has been compacted into a close-packed configuration. It will be understood, of course, that the glass tube is used only to make it easier to explain the invention, and that in practical operation metal tubes would be used, a least in most applications.

In the exploded view of FIG. 2 will be seen sleeve 22 firmly attached to the top of the outer side of the tube 13, as by brazing, and having external threads 23. Above tube 13 is pressure means 24 which consists of cylinder 25 snugly fitting within the bore of tube 13, and bottom 26 contaning perforations 27. These are sufficiently large in diameter to permit passage of the smaller spheres 21a to be added to the configuraton within the tube 13, but small enough to present spheres of largest diameter 21 (referred to as $d_1$) from coming up through them. We refer to this element as a thimble for convenience.

Above the pressure device, or thimble 24, is pressure cap 28 consisting of side portion 29 having internal threads 30, and top 31, having filling hole 32, of smaller diameter than that of cylinder 25 of pressure thimble 24.

In operating our apparatus the spheres of largest diameter 21 are first put into a close-packed configuration within the tube 13. This could be done in a conventional apparatus without the rattle cage 14, but it is probably more convenient in most cases, and probably somewhat faster as well, to do the compacting in our apparatus using the rattle cage. This puts the spheres 21 into the close-packed configuration shown.

Next the pressure thimble 24 is lowered into the bore of tube 13 until it rests on top of the configuration of spheres 21; the pressure cap 28 is brought down until its internal threads 30 engage the external threads 23 of sleeve 20 and the cap is tightened until the bottom 26 of pressure thimble 24 is in firm contact with the top row of spheres 21. As the operation proceeds cap 28 is tightened from time to time as required to maintain the contact and thus prevent spheres 21 from moving out of their close-packed configuration.

Next spheres 21a of lesser diameter ($d_2$) are introduced through the filling hole 31 in the middle of cap 28 and the vibrator is activated. It is preferable in most cases to add the $d_2$ spheres in comparatively small increments since building up of a head pressure in thimble 24 is apt to prevent their passage through the perforations 27. The axial motion imparted to the tube 13 by the vibrator 11 is supplemented by radial motion as the rattle cage 14 moves back and forth against the tube 13, with the result that agglomeration of the $d_2$ spheres 21a are broken up, and bridging generally is prevented. At the same time pressure from thimble 24 keeps the $d_1$ spheres 21 in place, so that they cannot rise and stratify, with the result that a uniform mixture, or dispersion of the $d_2$ spheres 21a is created within the void space between the $d_1$ spheres 21.

Similarly, if it is desired to add a third component, or spheres of still smaller diameter ($d_3$), after the dispersion of the $d_2$ spheres is complete, pressure thimble 24 is removed and replaced by another with smaller perforations 27, which will permit passage of the $d_3$ spheres from above, but hold both the $d_1$ and $d_2$ spheres in place as a two-component, or binary, matrix. Thus in the same way a dispersion of $d_1$, $d_2$ and $d_3$ spheres may be formed.

Further additions of $d_4$ and even smaller spheres could be added, at least until they become so small that plastic deformations begin to become significant.

In operating our apparatus we have found that there are significant variations in the power required to bring about compaction at different frequencies of vibration. In the case of sea sand, for example, vibration at about 180 cycles per second has only about one-twentieth the power requirement as when the vibration is at either about 110 cycles per second or about 700 cycles per second. This is doubtless a resonance phenomenon, and every substance is believed to have resonance frequencies at which compaction takes place with unusual ease. These should be determined in advance of carrying out the invention on any extended scale. In the case of metal spheres we have found that the apparatus works well when the frequency of vibration is 80 cycles per second with a maximum acceleration of 7.7 times the acceleration of gravity (7.7 $g$'s), or 75.5 meters per second per second. We have found that equally good results follow when the frequency is 60 cycles per second, which is fortunate since this coincides with the number of cycles commonly used in commercial alternatnig current. This should lead to important simplifications of equipment, and resulting economies when the invention is put into operation on a commercial scale.

As we stated above, the arrangement of spheres of different sizes together has been on a trial and error basis, or when it has been attempted to be done with the aid of mathematical analysis the computations required were found to be so complicated that their use was impractical.

In order to remedy this situation spheres, or shot, of twelve different size classifications were loaded into five sizes of cylindrical steel tubes. The tube inside diameters were the following, each tube size being stated first in inches and, immediately following, in centimeters in parentheses: 0.261 (0.662), 0.381 (0.969), 0.480 (1.22), 0.621 (1.58), and 1.003 (2.55). The tubes were secured onto a vibrator, filled with shot and vibrated for 10 minutes according to the invention at 80 cycles per second and at an acceleration 7.7 $g$'s, or 75.5 meters per second per second. The vibration was stopped and the settled depth of the shot in each tube was measured and the weight of the shot was determined. Since the volume of the tubes per unit length was known, the packed density was easily found. Reference is now made to FIG. 3, the top curve AB, of which is a plot of the packing efficiency of the charges of the tubes against the ratio of the inner diameter of the tubes to the diameter of the shot in the respective tubes, or $D/d$. Packing efficiency, or void packing efficiency, abbreviated $P_e$, is the fraction of available void volumes which is occupied by the entering solid material. It should be distinguished from packing fraction $P_f$, which is the fraction of the total container volume occupied by the compacted material.

It will be noted that the curve AB is of catenary character, and we have determined that it may be represented by the following equation:

$$P_e = 0.635 - 0.26 e^{-0.313 D/d_1}$$

where $P_e$ is the packing efficiency, D is the inside diameter of tube, $d_1$ the diameter of the spheres within the same tube and $e$ the base of natural logarithms. Thus we have found, as a preliminary step, a reliable mathematical method for determining in advance the packing efficiency of one-component compaction within tubes of spheres of any size.

Following the same general procedure, packing efficiencies of binary and ternary mixtures of spherical components were determined by means of our apparatus including the rattle cage 14 and pressure thimble 24, the apparatus being operated in the manner described above at 80 cycles per second and an acceleration of 7.7 $g$'s. All primary components, or $d_1$ spheres, were vibrated for ten minutes; the pressure thimble 24 was then screwed down against the resulting configuration and the binary components, or $d_2$ spheres, were likewise vibrated for ten minutes. The same procedure was followed with the ternary components, or $d_3$ spheres.

Reference is again made to FIG. 3, the lower curve of which, CD, is a plot of packing efficiency of the binary, ternary and other components of smaller size against the ratio of diameter to the component of the next largest size to the diameter of the spheres of the component in question. Surprisingly, all points in all these plots fall along the same curve CD.

The packing efficiency of the second component may be found by the following equation:

$$P_e = 0.635 - 0.737 e^{-0.201 d_1/d_2}$$

For some purposes it is desirable to know the total packing fraction of a binary dispersion. This may be derived from the equations above given as follows:

Since, for a single component, $$P_e = 0.635 - 0.216 e^{-0.313 D/d_1}$$

the void fraction remaining, or $V_f$, may be determined by subtracting the preceding equation from unity, or $$V_f = 0.365 + 0.216 e^{-0.313 D/d_1}$$

Since for a single component the packing efficiency and packing fraction are by definition the same, the total packing fraction of a binary mixture is this plus the product of the remaining void fraction times the packing efficiency of the binary component, or $d_2$ spheres, thus $$P_{fb} = [0.635 - 0.216 e^{-0.313 D/d_1}]$$
$$+ [0.365 + 0.216 e^{-0.313 D/d_1}]$$
$$[0.635 - 0.737 e^{-0.201 d_1/d_2}]$$

or $$[0.867 - 0.079 e^{-0.313 D/d_1}] - [0.269 e^{-0.201 d_1/d_2}]$$
$$- [0.159 e^{-0.313 D/d_1 - 0.201 d_1/d_2}]$$

The term 0.867 is the limiting density for a binary system, and the abbreviation $P_{fb}$ signifies the total packing fraction of a binary system.

Similarly, the equation of the total packing fraction of a ternary system $P_{ft}$ may be worked out, as follows:

$$P_{ft} = 0.951 - [0.029 e^{-0.313 D/d_1}]$$
$$- [0.098 (e^{-0.201 d_1/d_2} + e^{-0.201 d_2/d_3})]$$
$$- [0.198 e^{-0.201 (d_1/d_2 + d_2/d_3)}]$$

Again, the term 0.951 is the limiting density for a ternary system.

The above formulae apply to cylindrical tubes of circular cross section. Only slight modifications of them are required to make them applicable to containers of different cross sections such as square tubes, plate type fuel elements, shell and tube fuel elements and the like.

The formulae may be modified to state their conclusions in terms of weight, rather than as packing efficiencies or packing fractions. The volume of tube and the specific gravity of the spheres being known, the weight of the total spheres in a dispersion may be found by multiplying these by the total packing fraction, as expressed by the following equation $$W_t = V_d \times G_s \times P_f$$

where $W_t$ is the total weight of the spheres in the dispersion, $V_d$ is the volume of the dispersion, $G_s$ is the specific gravity of the spheres and $P_f$ is the total packing fraction of the dispersion.

This general method may be modified to arrive at the weight of the next smaller charge of spheres to be added to complete a dispersion. For example, in fabricating a binary dispersion the weight of the smaller, or $d_2$, spheres may be found by subtracting the weight of the larger spheres from the total weight, according to this formula:

$$W_{d_2} = [V_d \times G_s \times P_{fb}] - W_{d_1}$$

where $W_{d_2}$ is the weight of the smaller, or $d_2$, spheres, and $W_{d_1}$ is the weight of the larger, or $d_1$, spheres.

Substituting the value of the packing fraction of the dispersion, the final equation takes this form:

$$W_{d_2} = [V_d \times G_s \times [(0.867 - 0.079 e^{-0.313 D/d_1})$$
$$- (0.269 e^{-0.201 d_1/d_2}) - (0.159 e^{-0.313 D/d_1 - 0.201 d_1/d_2})]] - W_{d_1}$$

In the same way an equation may be arrived at showing the weight of $d_3$ spheres ($W_{d_3}$) required for a ternary dispersion:

$$W_{d_3} = [V_d \times G_s \times [0.951 - 0.029 e^{-0.313 D/d_1}]$$
$$- [0.098 (e^{-0.201 d_1/d_2} + e^{-0.201 d_2/d_3})]$$
$$- [0.198 e^{-0.201 (d_1/d_2 + d_2/d_3)}]] - [W_{d_1} + W_{d_2}]$$

Likewise the weight of the charge of $d_4$ spheres and others of still lesser diameter may be calculated. In all these cases our method enables the exact weight of spheres to be foretold exactly, and then they may be fitted into the available void space without danger of overaddition or underaddition simply by weighing out the calculated weight indicated by our formulae, and introducing them into a pressure thimble 24 with perforations 27 of the proper size while our apparatus is vibrating in the manner above described.

The formulae above given apply strictly to dispersions within cylindrical tubes of circular cross section. With only slight modifications they can be made to apply to containers of different types of cross section such as square tubes, shell and tube types of fuel elements and plate fuel elements of elongated rectangular cross section.

Referring once again to FIG. 3 it will be noted that the lower curve CD approaches an intercept on the X-axis at about 4. This means that the $d_1/d_2$ ratio must be at least 4; otherwise the $d_2$ spheres will be too large to penetrate the void space between the $d_1$ spheres. Since all the other ratios such as $d_2/d_3$ and so on fall on the same curve CD, these ratios must also be at least four, or, in other words, in all cases the diameter of any charge of spheres must be less than one-fourth the diameter of the spheres of the charge next preceding it.

*Example I*

A ternary dispersion was made in a tube of cylindrical cross section having an internal diameter of 0.621 inch, 12 inches long and having a volume of 58.729 cc. The dispersion was made of steel spheres of the same specific gravity, the largest, or $d_1$, spheres having diameters of 0.250 inch, the intermediate, or $d_2$, spheres having diameters of 0.043 inch, and the smallest, or $d_3$, spheres having diameters of 0.0075 inch; accordingly, the $D/d_1$ ratio was 2.48, the $d_1/d_2$ ratio 5.8 and the $d_2/d_3$ ratio 5.7. Applying these ratios to the above-described formulae, the total packing fraction ($P_{ft}$) of the completed dispersion was calculated to be 0.865 and the charges of the $d_1$, $d_2$ and $d_3$ spheres, respectively, 222.120 grams, 99.478 grams and 47.930 grams.

The first, or $d_1$, charge was vibrated in the apparatus of the invention including a rattle cage 14 with a power of about 80 watts, a maximum acceleration of 7.0 $g$'s at a frequency of 80 cycles per second (cy./sec.) for 10 minutes. This brought the $d_1$ spheres into a close-packed configuration.

A pressure thimble 24 was then introduced having perforations 27 smaller than the $d_1$ spheres but large enough to permit passage of the $d_2$ spheres, and this was tightened down over the close-packed configuration of $d_1$ spheres by the pressure cap 28. The vibrator 11 was reactivated in the same way as before and the calculated charge weight of $d_2$ spheres, 99.478 grams, was introduced in small increments through the filling hole 32 during the early part of the vibration. The total time of this second vibration, which also included the radial vibration of the rattle cage 14, was 15 minutes.

The pressure thimble 24 was changed to one with smaller perforations so as to admit the $d_3$ spheres but prevent passage of the $d_2$ spheres, and, of course, the $d_1$ spheres. The combined vibration was resumed as before for 20 minutes during the early part of which the calculated charge weight of the $d_3$ spheres, 47.930 grams, was introduced in small increments.

The resulting dispersion was of close-packed uniform character.

Example II

A tertiary dispersion was made in a tube of cylindrical cross section 1.003 inches in inner diameter, 12 inches long, and having a volume of 155.041 cc. The spheres were of steel, the diameters of the $d_1$, $d_2$ and $d_3$ spheres being the same as in Example I, or 0.250 inch, .043 inch and .0075 inch, respectively. This made the $D/d_1$, $d_1/d_2$ and $d_2/d_3$ ratios, respectively, 4.01, 5.8 and 5.7. Applying this data to the formulae of the invention gave a total packing fraction ($P_{ft}$) of 0.882, and the following $d_1$, $d_2$ and $d_3$ charge weights, respectively: 647.437 grams, 220.381 grams and 123.485 grams. The calculated charges were vibrated in three stages as in Example I, for the same lengths of time and under the same conditions. Again, the resulting dispersion was of close-packed uniform character.

Example III

A tertiary dispersion was made in a tube with the same dimensions as the tube used in Example I, and with $d_1$, $d_2$ and $d_3$ spheres having the following respective diameters: 0.250 inch, 0.036 inch and 0.0075 inch. The $D/d_1$, $d_1/d_2$ and $d_2/d_3$ ratios were, respectively, 2.48, 6.9 and 4.8. Application of the formulae of the invention gave a $P_{ft}$ of 0.861 and $d_1$, $d_2$ and $d_3$ charge weights of, respectively, 222.10 grams, 104.365 grams and 40.480 grams. These were introduced into the tube and vibrated in the same manner as in the preceding examples, except that the final, or third, stage of vibration was for 40 minutes. A well-arranged uniform dispersion resulted.

Example IV

The experiment of Example III was repeated in all respects except that the tube used had the dimensions of the tube used in Example II, or an inner diameter of 1.003. This made the $D/d_1$ ratio 4.01, the other ratios being the same as in Example III. Applying the same formulae gave a $P_{ft}$ of 0.878 and $d_1$, $d_2$ and $d_3$ charge weights of 647.434 grams, 240.092 grams and 102.006 grams, respectively. These weights were introduced into the tube and vibrated as in Example III, and produced a dispersion of the same desirable characteristics.

It will be understood that the invention described herein may be modified within the scope of the appended claims.

The embodiments of the invention in which an exclusive property or privilege is claimed are defined as follows:

1. A method of making a uniform close-packed dispersion of masses of different diameters within a container, comprising subjecting masses of a predetermined diameter to axial vibration within the container until a close-packed uniform configuration is attained, and thereafter introducing masses of smaller diameter while holding the configuration last previously attained in position by pressure and subjecting it to combined axial and radial vibration until a uniform, close-packed configuration is attained.

2. A method of making a uniform close-packed dispersion of masses of different diameters within a container, comprising subjecting the masses of largest diameter to axial vibration within the container until a close-packed uniform configuration is attained, holding the said configuration in place by pressure while subjecting it to combined axial and radial vibration and introducing the masses of next largest diameter until a uniform binary close-packed configuration is attained, and thereafter successively introducing masses of decreasing diameter while holding the configuration last previously attained in position by pressure and subjecting it to combined axial and radial vibration until a uniform, close-packed configuration is attained.

3. The method of claim 1 where the diameter of the smaller masses is less than one-fourth the diameter of the larger masses.

4. The method of claim 2 where the diameter of the said masses of next larger diameter are less than one-fourth the diameter of the masses of largest diameter and the diameters of said masses of decreasing diameter are less than one-fourth the diameters of the masses in the configuration last previously attained.

5. A method of fabricating a uniform binary dispersion of spheres of two different diameters within a tube of circular cross section, comprising vibratorily compacting a charge of spheres of larger diameter within the tube into a close-packed configuration to the depth desired, exerting pressure on the configuration sufficient to maintain it while adding a charge of spheres of smaller diameter to the tube and subjecting it to combined axial and radial vibration until the spheres of smaller diameter occupy the void space available between the spheres of larger diameter, thereby forming a close-packed uniform binary configuration the ratio of the diameter of the spheres of larger diameter to the diameter of the spheres of smaller diameter being at least four.

6. A method of fabricating a uniform ternary dispersion of spheres of three different diameters within a tube of circular cross section, comprising vibratorily compacting a charge of spheres of largest diameter within the tube into a close-packed configuration to the depth desired, exerting pressure on the configuration sufficient to maintain it while adding a charge of spheres of intermediate diameters and subjecting it to combined axial and radial vibration until the spheres of intermediate diameter occupy the void space available between the spheres of larger diameter, thereby forming a close-packed binary configuration, adding, while exerting pressure on said binary configuration sufficient to maintain it and resuming said combined axial and radial vibration, a charge of spheres of smallest diameter until the spheres of smallest diameter occupy the void space available to them between the other two charges of spheres, thereby forming a close-packed uniform ternary configuration, the ratio of the diameter of the spheres of larger diameter to the diameter of spheres of intermediate diameter, and the ratio of the diameter of the spheres of intermediate diameter to the diameter of the spheres of smallest diameter being at least four.

7. Apparatus of vibratorily compacting a dispersion of masses of different diameters into a uniform close-packed configuration within a container, comprising an axial vibrating means, means of fixing the container to the axial vibrating means, a radial vibrating means, pressure means for maintaining masses of larger diameter in a close-packed configuration during combined vibration by said axial and radial vibrating means, and means for introducing masses of lesser diameter during said combined vibration.

8. The apparatus of claim 7 wherein the container is a tube of circular cross section.

9. Apparatus for vibratorily compacting a dispersion of spheres of different diameters into a uniform close-packed configuration within a tube, comprising an axial vibrating means, means for fixing the bottom of the tube to the axial vibrating means, a cage surrounding the tube with freedom of radial movement when the axial vibrating means is activated, and a pressure thimble adapted to exert downward pressure from the top of the tube sufficient to hold spheres of larger diameter in a close-packed configuration and having perforations sufficiently large to admit spheres of smaller diameter into the tube, while preventing passage of spheres of larger diameter.

10. Apparatus for vibratorily compacting a dispersion of spheres of different diameter into a uniform close-packed configuration within a tube of circular cross section, comprising an axial vibrator, a holder firmly holding the bottom of the tube to the vibrator, a rattle cage closely surrounding the tube along a major portion of its length, and loosely resting on the vibrator, external threads around the top portion of the tube, a pressure thimble in the shape of a cylinder closely fitting within the bore of the tube with a bottom having perforations therein, and a pressure cape having internal threads mating with the external threads around the top portion of the tube and having a filling hole in the middle of its top of lesser diameter than the inner diameter of the pressure thimble.

No references cited.

LAVERNE D. GEIGER, *Primary Examiner.*

H. BELL, *Examiner.*